United States Patent [19]
Cummins et al.

[11] 3,872,972

[45] Mar. 25, 1975

[54] BICYCLE STORAGE DEVICE

[76] Inventors: Richard D. Cummins; Claire J. Cummins, both of 4923 Appletree Rd., Hamburg, N.Y. 14075

[22] Filed: Mar. 11, 1974

[21] Appl. No.: 449,617

[52] U.S. Cl. ............................. 211/17, 211/117
[51] Int. Cl. .................................. A47f 7/00
[58] Field of Search ............ 211/17, 18, 19, 20, 21, 211/22, 113, 117; 294/81 R

[56] References Cited
UNITED STATES PATENTS

| | | | |
|---|---|---|---|
| 557,567 | 4/1896 | Eddy | 211/17 |
| 579,584 | 3/1897 | Jessup | 211/17 |
| 610,656 | 9/1898 | Martin | 211/18 |
| 3,382,559 | 1/1974 | Wright | 211/113 |

FOREIGN PATENTS OR APPLICATIONS

| | | | |
|---|---|---|---|
| 6,433 | 12/1898 | United Kingdom | 211/18 |
| 6,611 | 1/1904 | United Kingdom | 211/22 |
| 1,097,303 | 1/1961 | Germany | 211/17 |

Primary Examiner—Marion Parsons, Jr.
Assistant Examiner—Robert A. Hafer
Attorney, Agent, or Firm—Bean & Bean

[57] ABSTRACT

A storage device for lifting and tilting a bicycle into a stored position adjacent a ceiling. The storage device features a cable suspended handle bar-seat hanger device, which is adjustable to accommodate the device to different bicycle sizes. A novel cable holder device facilitating adjustable connection of the several elements of the storage device is additionally disclosed.

11 Claims, 9 Drawing Figures

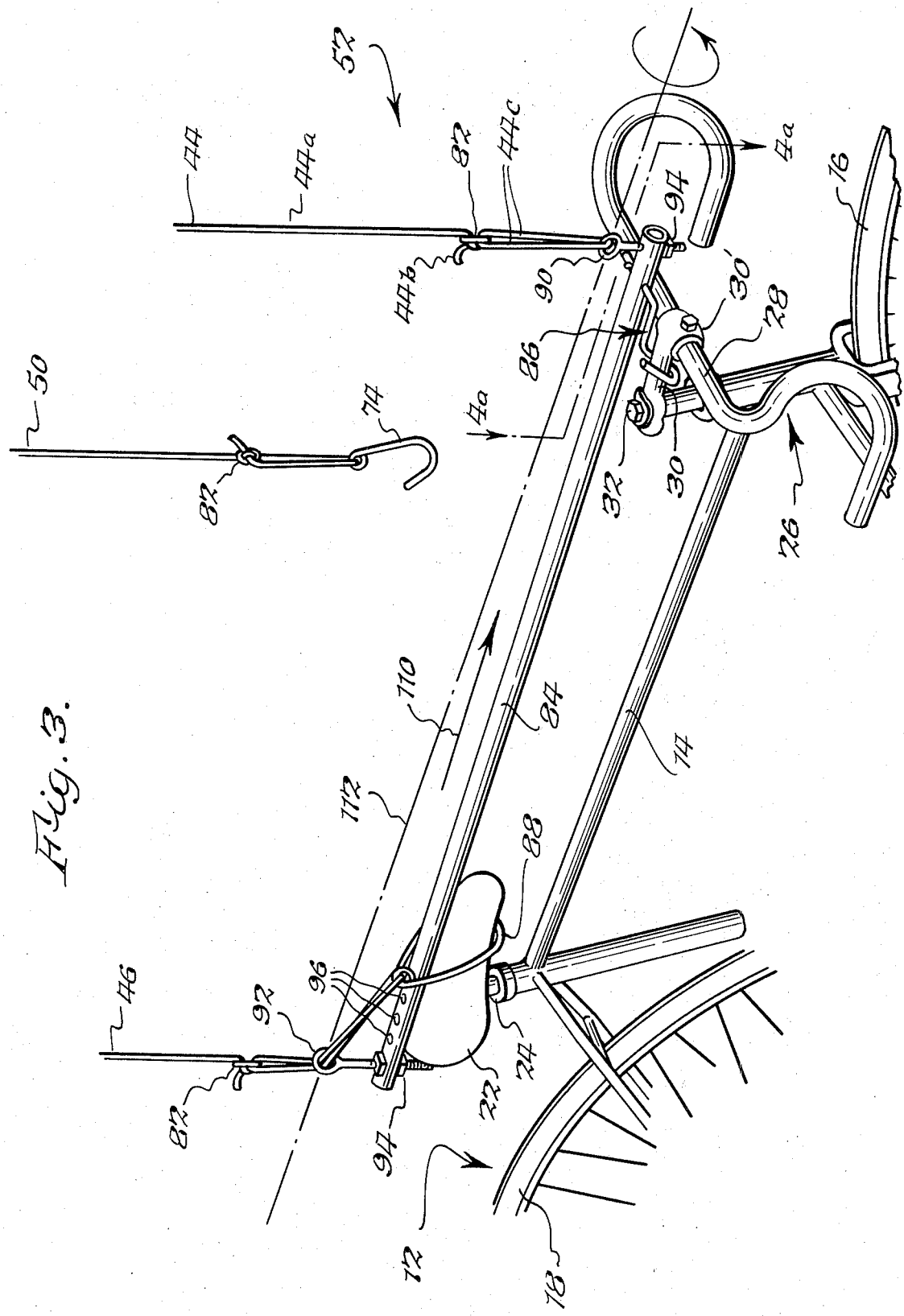

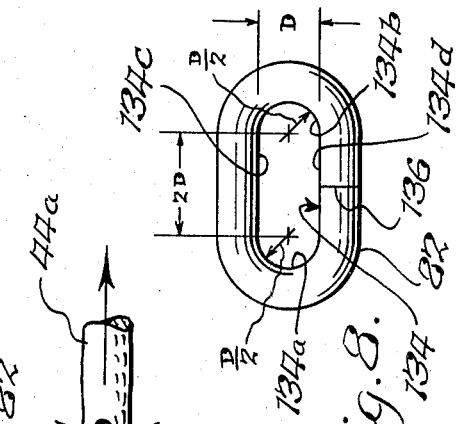
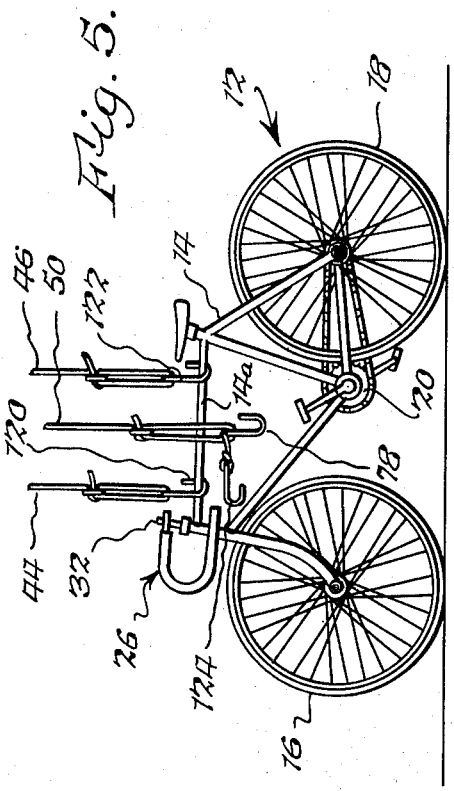
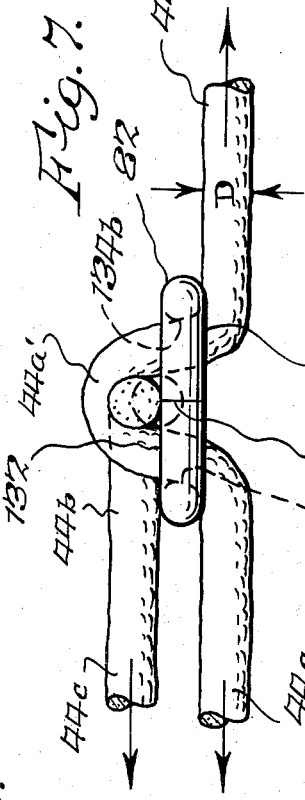
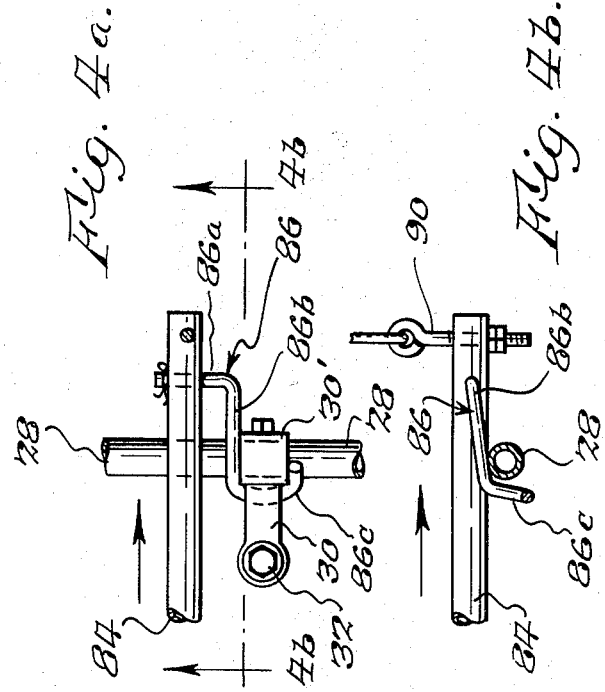
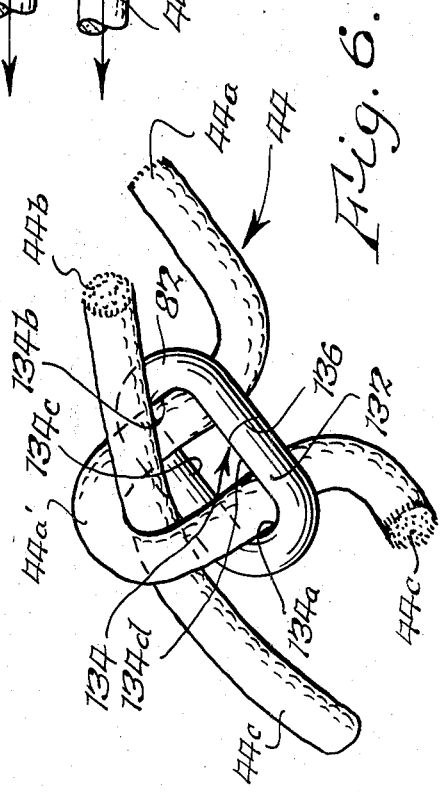

BICYCLE STORAGE DEVICE

BACKGROUND OF THE INVENTION

The invention relates to a device for storing a bicycle and more particularly to a device for storing a bicycle closely adjacent to a ceiling, so as to afford maximum head room clearance beneath a stored bicycle.

The present storage device employs a cable system, which may be quickly attached to the bicycle for purposes of elevating the bicycle and in tilting the elevated bicycle such that its frame assumes a more or less horizontal orientation relative to the ceiling of a garage or other storage area. Manual control of the vertical movements of the bicycle is facilitated by employing a counterweight device.

The preferred form of the invention features a novel handle bar-seat hanger device, which is readily adjustable to accommodate the device to different bicycle sizes, such device additionally serving to prevent turning of the front wheel of the bicycle while in its stored position.

The preferred form of the invention additionally features a novel cable holder device for use in adjustably and removably interconnecting elements of the storage device. This device, however, possesses more general utility and can be employed in any situation where it is desired to provide a knockdown, readily adjustable cabling system to constrain a pair of members from relative separating movement, such as for instance, movement of a tent relative to a stake and movement of an airplane relative to a tie-down anchor.

DRAWINGS

FIG. 3 is a rear perspective view showing the handlebar seat holder device attached to the bicycle;

FIG. 4a is a fragmentary view taken generally along line 4a—4a in FIG. 3;

FIG. 4b is a sectional view taken generally along line 4b—4b in FIG. 4a;

FIG. 5 is a front elevational view illustrating a modified form of a storage device;

FIG. 6 is an enlarged perpsective view of the cable holder device illustrating the mode of threading a cable therethrough;

FIG. 7 is a side elevational view of the cable holder device and cable shown in FIG. 6; and FIG. 8 is a plan view of the cable holder device.

DETAILED DESCRIPTION

Figure 1:
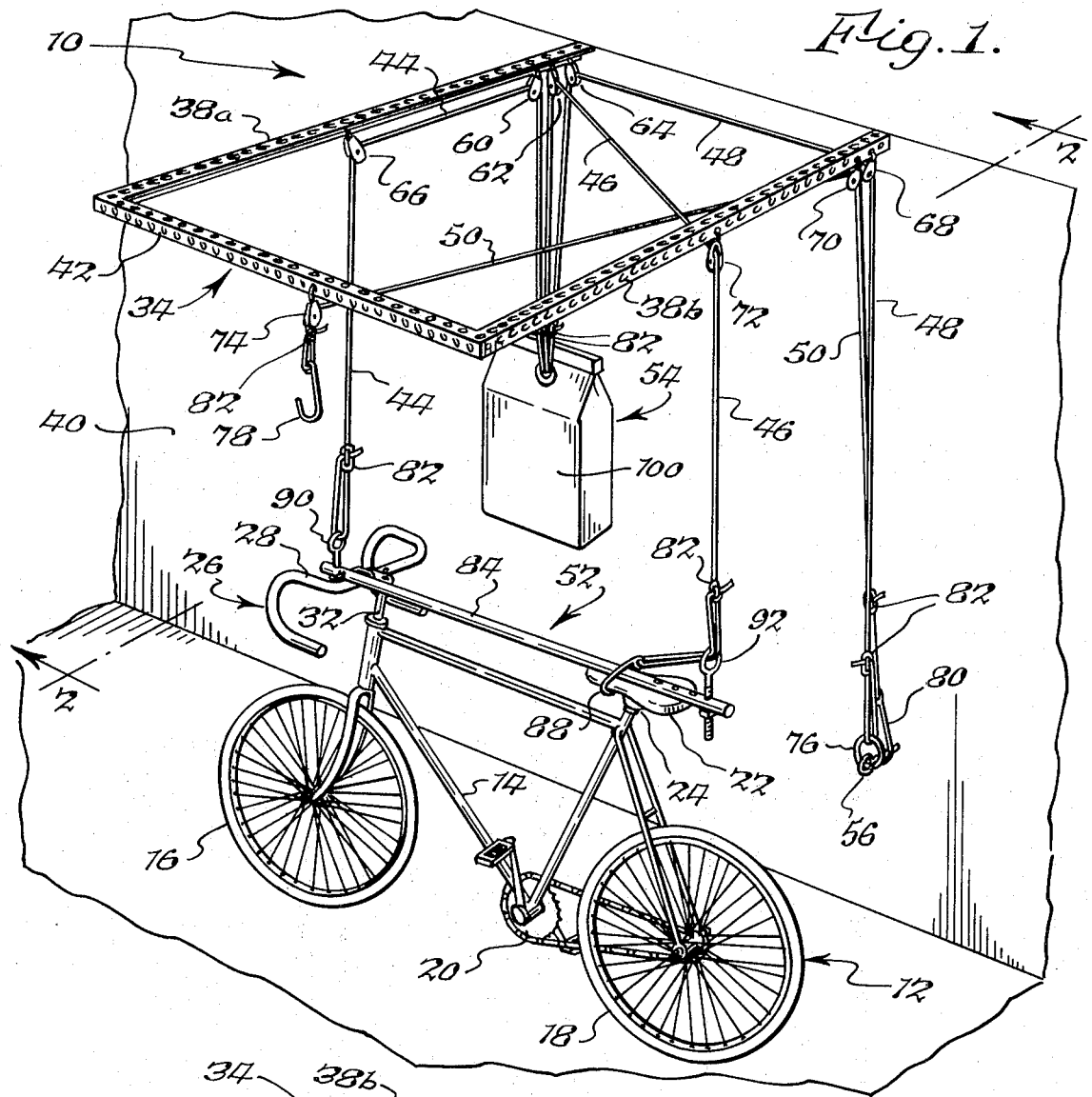
FIG. 1 is a perspective view of the storage device of the present invention prior to movement of the bike into stored position.
Figure 2:
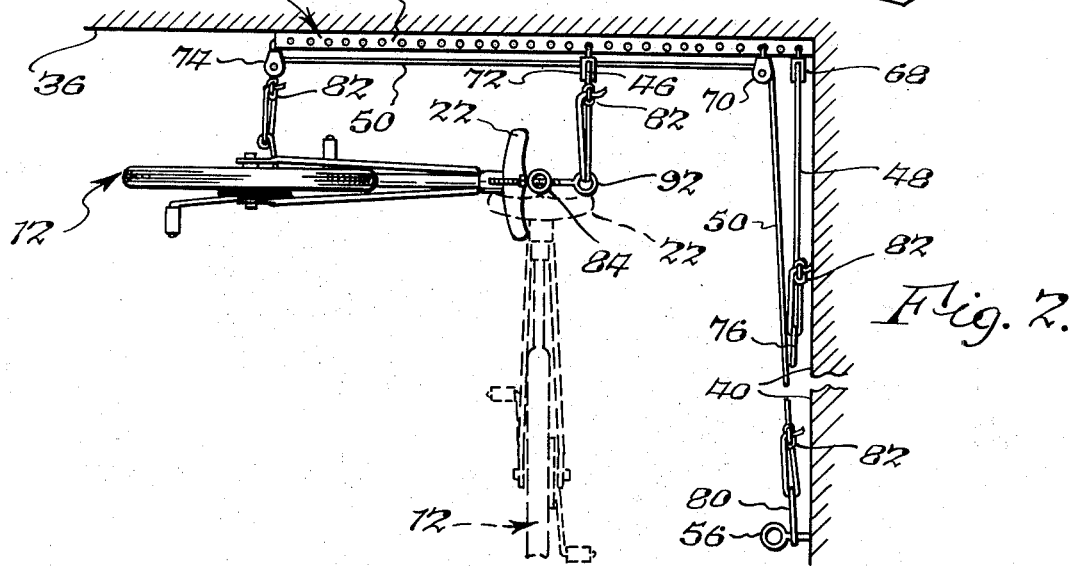
FIG. 2 is an elevational view of the storage device shown in FIG. 1, but with a bicycle shown in full and partially stored positions in full and phantom line, respectively.

Reference is now made particularly to FIGS. 1 and 2, wherein the storage device according to the preferred form of the present invention is designated as 10 and shown in association with bicycle 12. While bicycle 12 may be of any conventional construction, it is shown for purposes of reference as being a standard boy's bike having a frame 14; front and rear tires 16 and 18; a sprocket wheel drive 20; a seat 22 adjustably fixed to frame 14 by post 24; and a handle bar device 26 having a transversely extending hand grip or handle bar 28 and a neck 30 extending rearwardly of its juncture with a central portion of the hand grip bar for connecting same for storing purposes to a front wheel mounting post 32. While neck 30 may be formed integrally with hand grip bar 26, it is more conventionally formed with an enlarged "socket" 30' for adjustably mounting the hand grip bar.

Storage device 10 includes a suitable mounting device, such as a mounting bracket 34, which may be affixed in any desired manner to a ceiling or rafters 36 of a storage area building, such as a garage, shown only in FIG. 2. Bracket 34 is shown as being of generally U-shaped configuration including a pair of essentially parallel leg portions 38a and 38b, which are essentially horizontally disposed and extended at right angles away from building side wall 40, and a base portion 42, which is spaced from side wall 40 and extends transversely of leg portions 38a and 38b.

Storage device 10 additionally includes a cabling system having first and second or bicycle elevating cables 44 and 46, a third or elevation control cable 48, and a fourth or bicycle tilt control cable 50; a bicycle hanger assembly 52; a suitable elevating cable bias mechanism, such as a counter weight assembly 54; a retaining or latch device, which may be in the form of retainer pin 56 suitably affixed to side wall 40; and a cable guiding pulley assembly carried by mounting bracket 34. The pulley assembly includes first, second and third pulleys 60, 62 and 64, which are mounted on leg portion 38a adjacent side wall 40; a fourth pulley 66, which is mounted on leg portion 38a intermediate its ends; fifth and sixth pulleys 68 and 70, which are mounted on leg portion 38b adjacent side wall 40; a seventh pulley 72, which is mounted on leg portion 38b intermediate its ends; and an eighth pulley 74, which is mounted on base portion 42 intermediate its ends. If desired, bracket 34 may be eliminated and the several pulleys fixed directly to the ceiling.

Again referring to FIG. 1, it will be understood that elevating cable 44 is passed through or trained over pulleys 60 and 66 with its first and second ends adjustably connected to assemblies 54 and 52, respectively. In a like manner, elevating cable 46 is passed through pulleys 62 and 72 with its first and second ends adjustably connected to assemblies 54 and 52, respectively. Elevation control cable 48 is passed through pulleys 64 and 68 with its first and second ends adjustably connected to assembly 54 and a hand pull ring 76, respectively. Tilt control cable 50 is passed through pulleys 70 and 74 with its first and second ends adjustably connected to a hook 78 and a hand pull ring 80, respectively. Cables 44, 46, 48 and 50 may be of any desired material and construction, so long as they are sufficiently flexible to permit their being trained about their respective pulleys and connected to their associated assemblies by holder devices or members 82 in the manner to be described.

Bicycle hanger assembly 52 is best shown in FIG. 3 as including an elongated rigid member, such as a bar or tube 84, which is dimensioned to permit first or front and second or rear ends thereof to overlie hand bar device 26 and seat 22, respectively; a constraining hook 86 carried by the front end of bar 84 for releasably engaging neck 30; a rigid retaining ring 88, which is adjustably connected to the second end of the elevating cable 46 and sized to encircle or loop about both the rear end of bar 84 and seat 22; a first eye hook 90, which is fixed to the front end of the bar and adjustably connected to the second end of first elevating cable 44; and a second eye hook 92, which is fixed to the rear end of bar 84 and adapted to guidingly receive the second end of second elevating cable 46. Eye hooks 90 and 92 may be fixed to bar 84 in any desired manner, but are preferably formed with threaded lower ends passed through holes drilled transversely through the bar and removably retained therewithin by nuts 94. Adjustments of eye hook 92, or alternative eye hook 90, lengthwise of the bar to accommodate different sizes of bicycles is permitted by providing additional through bored holes, as at 96. If desired, retaining ring 88 may be dispensed with and the second end of elevating cable 46 merely looped about bar 84 and seat 22.

Now referring specifically to FIGS. 3, 4a and 4b, it will be understood that constraining hook 86 is shaped to define a straight shank end portion 86a, which is journalled for rotation within a bore opening extending horizontally transversely through the front end of bar 84; a straight connecting portion 86b, which is arranged to extend rearwardly of and assume a right angular relationship with end portion 86a; and a generally U-shaped latch end portion 86c, which extends downwardly and rearwardly of connecting portion 86b, as viewed in FIG. 4b. Also as viewed in FIG. 4b, end portion 86c may be considered as being within a plane arranged parallel to the axis of rotation of end portion 86a and at an angle of approximately 60° relative to a plane defined by portions 86a and 86b. As will be apparent, end portion 86c is sized such that its upstanding legs closely straddle side surfaces of neck 30 which its base portion engages the lower surface thereof.

Counterweight assembly 54 may be of any desired construction, but would preferably comprise a "bag" 100, which is formed of cloth or plastic and filled with a material, such as sand, in an amount sufficient to substantially counterbalance the weight of bicycle 12. The first ends of cables 44, 46 and 48 may be suitably attached to bag 100, such as by looping the ends of such cables through bag eyelet 102 and employing cable holder devices 82. It will be appreciated that other suitable means, such as a spring device, may be readily employed to normally bias the first ends of cables 44, 46 and 48 for downward movement into a bicycle storage position.

When storage device 10 is in an inoperative or unused condition, both of hand pull rings 76 and 82 are looped over pin 56, whereby to retain bag 100 and hook 78 in their elevated or uppermost position illustrated in FIG. 1. Assembly 52 may be retained out of the way in non-use position, not shown, adjacent side wall 40 by placing the front and rear ends of bar 84 between the side wall and bag 100 and cables 48 or 50, respectively.

When it is desired to store bicycle 12, the latter is positioned beneath storage device 10 and assembly 52 removed from its non-use position and attached to the bicycle in the manner indicated in FIGS. 1 and 3. Specifically, bar 84 and hook 86 are first manipulated to position latch end portion 86c in underlying relationship with neck 30. Thereafter, the rear of bicycle 12 is manually lifted or elevated sufficiently to permit retaining ring 88 to be looped under the front end of seat 22 and then released causing the weight of the otherwise unsupported rear end of the bicycle to draw cable 46 taut. Tightening of cable 46 in this manner or as a result of subsequent elevation of the bicycle acts via eye hook 92 to establish a force or thrust acting lengthwise of bar 84 as indicated by arrow 110 in FIG. 3. This force causes the front end of bar 84 to move forwardly such as to place hook connecting portion 86b in overlying engagement with hand grip bar 26; this causing a clockwise rotation of hook 86, as viewed in FIG. 3 to bring latch end portion 86c into firm frictional engagement with the lower surface of neck 30. Forward movement of bar 84 is preferably determined by engagement of latch end portion 86c with the rear of socket 30', and in this forward condition eye hook 92 would be spaced slightly from seat 22 to prevent abrading contact therebetween. Also, as will be noted from viewing FIGS. 3 and 4a, the front end of bar 84 is offset relative to the center line of the bicycle to avoid contact with any gear or other controls which may be carried thereby. It is also important to note that this arrangement serves to lock or prevent rotation of front wheel 16 about the axis of mounting post 32 when the bicycle is swung into its fully stored position in the manner to be described.

Pull ring 76 is then released from retainer pin 56 and bag 100 permitted to descend under the influence of gravity, whereby to elevate bicycle 12 into its partially stored position illustrated in phantom line in FIG. 2, such position being determined by engagement of a stop in the form of holder device 82, which is adjustably associated with cable 44, with pulley 66. The position of the stop lengthwise of cable 44 is determined by the requirement that hand grip bar 28 clear ceiling 36 when bicycle 12 is swung up into its fully stored position shown in full line in FIG. 2.

Positioning of bicycle 12 in its fully stored position is effected by removing hand pull ring 80 from retaining pin 56; manually drawing hook 78 downwardly from its upper or stored position sufficiently to permit attachment thereof to sprocket 20 of the previously elevated bicycle; pulling downwardly on pull ring 80 to swing the bicycle upwardly into fully stored position about the pivot axis through the eyes of hooks 90 and 92 designated as 112 in FIG. 3, and finally reattaching hand pull ring 80 to retaining pin 56. A bicycle may be removed from storage device 10 by reversing the foregoing steps.

By again referring to FIG. 3, it will be understood that the off-setting of pivot axis 112 relative to the areas of attachment of bar 84 to bicycle 12 serves to produce a torque about such axis when the bicycle is swung into fully stored position, which in turn serves to positively retain hook 86 in locking engagement with neck 30. The vertical spacing between the eye of hook 92 and bar 84 also permits the rear end of the bicycle to be disclosed closely adjacent ceiling 36 when the bicycle is swung into fully stored position.

Reference is now made to FIG. 5, which illustrates a modified form of the present invention, which is particularly adapted for use with a boy's bicycle wherein frame 14 includes a horizontally disposed upper frame member 14a. In this construction, hanger assembly merely includes a pair of hooks 120 and 122, which are adjustably connected to the second ends of cables 44 and 46, respectively, and adapted to engage with frame member 14a. Further, in this form of the invention, rotation of front wheel 16 about the axis of post 32 is prevented by a hook 124, which is adjustably connected to the end of cable 50 or hook 78 and adapted to be looped over the rim of the front wheel when the bicycle is in its partially stored position. The remaining portions of this modified construction may be identical to those previously described with reference to FIGS. 1-4b.

Reference is now made particularly to FIGS. 6, 7 and 8, wherein holder device or member 82 is shown as being in the form of a metal wire of circular cross-section, which is bent into a "chain link" or "elongated toroidal" shaped configuration to define spaced first and second surfaces 130 and 132, respectively, and an elongated slot 134 opening through such surfaces. It is critical to the operation of holder device 82 that the size and configuration of slot 134 bears a specific relationship to the given diameter "D" of the fixable cable with which it is employed. In this connection, reference is made to FIG. 8, wherein slot 134 is shown as having a width which corresponds essentially to the given cable diameter D and a length which corresponds essentially to three times such given diameter or 3D. Preferably, the opposite ends 134a and 134b of slot 134 are of semi-circular configuration, when viewed in plan with radii of curvature corresponding to D/2.

The thickness or diameter of the wire stock used in forming member 82 is not critical, so long as its strength is sufficient to prevent opening of the "link joint" 136 or other deformation of the member which would cause deformation of slot 134. Moreover, it will be understood that the "chain link" configuration of member 82 is preferred, since no rough edges are present to damage the cable. However, if desired, member 82 may be simply in the form of a flat sheet or plate of metal, wood or plastic, which has been punched to produce slot 134.

To understand the operation of member 82, reference will be made to its use with cable 44 (FIGS. 3, 6 and 7), wherein cable 44 may be considered as having a "reach" portion 44a, which is connected to bag 100 (hereinafter termed a "first member") and a "dead end" portion 44b. Reach portion 44a and dead end portion 44b cooperate to define a "looped" portion 44c, which is looped around, e.g., through the eye of eye hook 90 (hereinafter termed a "second member"). As best shown in FIG. 6, member 82 is used to attach eye hook 90 to cable 44 by the steps of deforming reach portion 44a to define a "bowed" portion 44a'; passing bowed portion 44a' through member opening 134 such that the reach portion lies in engagement with first surface 130 adjacent opposite slot ends 134a and 134b; passing dead end portion 44b through the eye of eye hook 90 and returning 44b to the region of member 82 to complete loop 44c; passing dead end portion transversely through bowed portion 44a'; and finally manually pulling on the dead end portion to draw same through the bowed portion. This final step serves to tension reach portion 44a and looped portion 44c with the result that bowed portion 44a' is reduced in size and drawn down into frictional engagement with dead end portion 44b, thereby to maintain the latter in frictional engagement with surface 132 adjacent opposite sides 134c and 134d of slot 134. This arrangement serves to constrain the first and second members from relatively separating movement since when a separating force is applied to either looped portion 44c or reach portion 44a, as indicated by the arrows in FIG. 7, such force tends to decrease the size of bowed portion 44a' and thus increase the clamping pressure on dead end portion 44b.

Clamping pressure on dead end portion 44b may normally be relieved to permit it to be drawn from within bowed portion 44a' when it is desired to release the holder device, by merely moving the first and second members towards one another in order to permit the reach and looped portions to become slack. If this is not convenient, a user may merely pull on the reach portion in a direction towards the second member, i.e., in a direction opposite to the arrow associated with the reach portion in FIG. 7, in order to slacken the looped portion of the cable. In this connection, it will be understood that flexible cables are normally extensible at least to some degree, due either to the material from which it is formed or the manner in which it is constructed. The term "cable" is used generically herein and meant to include terms such as "rope" and "cord".

Adjustments of a holder device lengthwise of its associated cable may be made when in a slackened state by pushing bowed portion 44a' through slot 134, as indicated in FIG. 6, and then again reducing its size by pulling on one or the other of its "legs," which are associated with either the reach or looped portions of such cable.

While we have found that the holder possesses particular utility for adjustably connecting the elements of our bicycle storage device, we anticipate that it possesses more general utility as for instance in diverse tie-down cable systems.

We claim:

1. A device for storing a bicycle in an elevated position, said bicycle being of the type having a handle bar device for effecting manual rotations of a front wheel relative to the frame of said bicycle for steering purposes, said storage device comprising:

biasing means;

a first cable having a first end thereof connected to said biasing means;

a second cable having a first end thereof connected to said biasing means;

attaching means for removably attaching second ends of said first and second cables to an upper portion of said bicycle;

a third cable having a first end thereof connected to said biasing means and a hand pull adjacent a second end thereof, said biasing means tending to move said first ends of said first, second and third cables vertically downwardly into a bicycle storage position;

a system for guiding said first, second and third cables whereby when said first ends thereof are moved vertically downwardly by said biasing means, said second ends thereof are forced to move vertically upwardly into a bicycle storage position thereof;

a stationary retainer means, said pull associated with said third cable being engageable with said retainer means for retaining said first ends of said first, second and third cables in a bicycle attachment position spaced vertically above said storage position thereof against the bias of said biasing means and said pull associated with said third cable being releasable from engagement with said retainer means to permit said biasing means to move said first ends of said first, second and third cables into said storage position thereof thereby to elevate the bicycle into a partial storage position; and a fourth cable having connecting means adjacent a first end thereof for removably connecting said fourth cable to a lower portion of said bicycle and having a hand pull adjacent a second end thereof, said fourth cable being guided by said system whereby when said hand pull of said fourth cable is moved downwardly, said bicycle is pivoted upwardly about said attaching means from said partial storage position into a fully stored position, said bicycle being retained in said fully stored position by engagement of said hand pull of said fourth cable with said retainer means, and one of said attaching means and said connecting means serving to constrain rotation of said front wheel from alignment with said frame when in said fully stored position.

2. A device according to claim 1, wherein cable holder devices are provided to adjustably connect said first ends of said first, second and third cables to said biasing means, to adjustably connect said second ends of said first and second cables to said attaching means, to adjustably connect said second end of said third cable to its associated hand pull, and to adjustably connect said first and second ends of said fourth cable to said connecting means and its associated hand pull, respectively, said holder devices each having an elongated slot opening between spaced first and second surfaces thereof, said slot having widthwise and lengthwise dimensions corresponding essentially to the diameter and three times the diameter of the cable end with which each of said holder devices is associated, each said cable end being characterized as including a reach portion and a dead end portion, said reach portion being connected to an associated opposite cable end, said reach and dead end portions cooperating to define a looped portion, said reach portion lying in engagement with said first surface adjacent opposite ends of said slot with that portion thereof arranged intermediate the points of engagement with said first surface being bowed to extend through said slot, said dead end portion lying in engagement with said second surface adjacent opposite sides of said slot and extending transversely through said bowed portion and being in underlying engagement therewith, and said looped portion being looped around the one of said biasing means, said attaching means, said hand pull and said connecting means with which said cable end is associated.

3. A device for storing a bicycle in an elevated position comprising:
biasing means;
a bicycle hanger assembly removably attachable to handle bar and seat portions of said bicycle;
a first cable having a first end thereof connected to said biasing means and a second end thereof connected to said hanger assembly;
a second cable having a first end thereof connected to said biasing means and a second end thereof connected to said hanger assembly;
a third cable having a first end thereof connected to said biasing means and a hand pull adjacent a second end thereof, said biasing means tending to move said first ends of said first, second and third cables, vertically downwardly into a bicycle storage position;
a system supportable by a building structure for guiding said first, second and third cables whereby when said first ends thereof are moved vertically downwardly by said biasing means, said second ends thereof are forced to move vertically upwardly into a bicycle storage position thereof;
stationary retainer means, said pull associated with said third cable being engageable with said retainer means for retaining said first ends of said first, second and third cables in a bicycle attachment position spaced vertically above said storage position thereof against the bias of said biasing means and said pull associated with said third cable being releasable from engagement with said retainer means to permit said biasing means to move said first ends of said first, second and third cables into said storage position thereof thereby to elevate said bicycle into a partial storage position; and
a fourth cable having means adjacent a first end thereof for removably connecting said fourth cable to a sprocket portion of said bicycle and having a hand pull adjacent a second end thereof, said fourth cable being guided by said system whereby when said hand pull of said fourth cable is moved downwardly, said bicycle is pivoted upwardly from said partial storage position into a fully stored position, said bicycle being retained in said fully stored position by engagement of said hand pull of said fourth cable with said retainer means.

4. A device according to claim 3, wherein said handle bar portion is characterized as having a transversely extending hand grip bar and a neck extending rearwardly of a juncture with said hand grip bar for attaching same to a post by which a front wheel of said bicycle is mounted for normal turning movements relative to the frame of said bicycle; and said hanger assembly comprises: an elongated rigid member dimensioned to position first and second ends thereof to overlie said hand grip bar and said seat portion, respectively, said first end of said member being connected to said second end of said first cable, a hook device extending transversely of said rigid member adjacent said first end thereof for underlying engagement with said neck, a loop dimensioned to encircle said rigid member and a front end of said seat portion, and an eye hook fixed to and upstanding above said second end of said rigid member, said second end of said second cable passing through the eye of said eye hook and being connected to said loop, whereby when said second cable is tensioned said loop tends to move rearwardly relative to said seat portion and said rigid member tends to move forwardly of said bicycle to maintain said hook device in latching engagement with said neck adjacent said juncture to thereby constrain said front wheel from turning relative to said frame.

5. A device according to claim 4, wherein said hook device includes a shank portion journaled by said first end of said rigid member for rotation about an axis extending transversely thereof, a connecting portion extending rearwardly from and at essentially right angles relative to said shank portion, and an essentially U-shaped latch portion extending downwardly and rearwardly relative to said connecting portion and lying within a plane arranged essentially parallel to the axis of rotation of said shank portion, said latch portion underlying and straddling said neck, and said connecting portion upon forward movement of said rigid member engaging said hand grip bar whereby to maintain said latch portion in latching engagement with said neck as aforesaid.

6. A device according to claim 3, wherein said system includes bracket means suspended beneath a ceiling of said building structure, said bracket means including essentially parallel first and second leg portions disposed to extend essentially horizontally from adjacent a side wall of said building structure and a base portion spaced from said side wall and extending transversely of said leg portions; and a plurality of pulleys including first, second and third pulleys fixed to said first leg portion adjacent said side wall, a fourth pulley fixed to said first leg portion intermediate said side wall and said base portion, fifth and sixth pulleys fixed to said second leg portion adjacent said side wall, a seventh pulley fixed to said second leg portion intermediate said side wall and said base portion and an eighth pulley fixed to said base portion intermediate said leg portions, said first cable extending from said biasing means being trained successively over said third and fourth pulleys, said second cable extending from said biasing means being trained successively over said second and seventh pulleys, said third cable extending from said biasing means being trained successively over said first and fifth pulleys, and said fourth cable extending from said pull being trained successively over said sixth and eighth pulleys.

7. A device according to claim 6, wherein said biasing means is a counterweight.

8. A device according to claim 6, wherein said retainer means is fixed to said side wall.

9. A device for storing a bicycle in an elevated position comprising:

biasing means;

a first cable having a first end thereof connected to said biasing means and a first attaching means adjacent a second end thereof for removably connecting said first cable to a front portion of the frame of said bicycle;

a second cable having a first end thereof connected to said biasing means and having a second attaching means adjacent a second end thereof for removably connecting said second cable to a rear portion of the frame of said bicycle;

a third cable having a first end thereof connected to said biasing means and a hand pull adjacent a second end thereof, said biasing means tending to move said first ends of said first, second and third cables vertically downwardly into a bicycle storage position:

a system for guiding said first, second and third cables whereby when said first ends thereof are moved vertically downwardly by said biasing means, said second ends thereof are forced to move vertically upwardly into a bicycle storage position thereof;

a stationary retainer means, said pull associated with said third cable being engageable with said retainer means for retaining said first ends of said first, second and third cables in a bicycle attachment position spaced vertically above said storage position thereof against the bias of said biasing means and said pull associated with said third cable being releasable from engagement with said retainer means to permit said biasing means to move said first ends of said first, second and third cables into said storage position thereof thereby to elevate the bicycle into a partial storage position; and a fourth cable having third attaching means adjacent a first end thereof for removably connecting said fourth cable to a sprocket area and to the rim of a front wheel of said bicycle and having a hand pull adjacent a second end thereof, said fourth cable being guided by said system whereby when said hand pull of said fourth cable is moved downwardly, said bicycle is pivoted upwardly about said first and second attaching means from said partial storage position into a fully stored position, said third attaching means constraining said front wheel from rotation relative to said frame when said bicycle is in said fully stored position, and said bicycle being retained in said fully stored position by engagement of said hand pull of said fourth cable with said retainer means.

10. In a bicycle storage device having first and second vertically extending bicycle elevating cables attached to front and rear portions of said bicycle for elevating said bicycle, the improvement for attaching lower ends of said elevating cables to the handle bar and seat portions of said bicycle while simultaneously constraining turning of a front wheel of said bicycle relative to its frame, said handle bar portion being characterized as having a transversely extending hand grip bar and a neck extending rearwardly of a juncture with said hand grip bar for attaching said hand grip bar to a mounting post by which said front wheel is mounted for normal turning movements relative to said frame, which comprises:

an elongated rigid member dimensioned to position first and second ends thereof to overlie said hand grip bar and said seat portion, respectively, said first end being connected to said lower end of said first cable;

a hook device extending transversely of said rigid member for underlying engagement with said neck;

a loop dimensioned to encircle said rigid member and a front end of said seat portion; and an eye hook fixed to and upstanding above said second end of said rigid member, said lower end of said second cable passing through the eye of said eye hook and being connected to said loop, whereby tensioning of said second cable tends to move said loop rearwardly over said front end of said seat portion and to move said rigid member forwardly of said bicycle to maintain said hook in latching engagement with said neck adjacent said juncture thereby to constrain turning of said front wheel relative to said frame.

11. The improvement according to claim 10, wherein said hook device includes a shank portion journaled by said first end of said rigid member for rotation about an axis extending transversely thereof, a connecting portion extending rearwardly from and at essentially right angles relative to said shank portion, and an essentially U-shaped latch portion extending downwardly and rearwardly relative to said connecting portion and lying within a plane arranged essentially parallel to the axis of rotation of said shank portion, said latch portion underlying and straddling said neck, and said connecting portion upon forward movement of said rigid member engaging said hand grip bar whereby to maintain said latch portion in latching engagement with said neck as aforesaid.

* * * * *